3,198,717
PROCESS FOR PREPARING MAGNETIC MATERIALS
Richard B. Falk, Greenville, Mich., assignor to General Electric Company, a corporation of New York
No Drawing. Filed Aug. 6, 1962, Ser. No. 214,852
4 Claims. (Cl. 204—10)

This application is a continuation-in-part of my copending application Serial No. 69,810, filed November 17, 1960, now U.S. Patent 3,156,650, and assigned to the same assignee as the present invention.

This invention relates to a process for preparing magnetic material comprising single domain magnetic particles of iron, cobalt and oxygen and to magnetic material produced by said process.

The aforesaid copending application is directed to a new type of magnetic material comprising single domain magnetic particles which possess a combination of high saturation magnetization and high coercive force. The magnetic material is composed of single domain magnetic particles of iron, cobalt and oxygen or, more specifically, particles containing a core of an alloy of iron and cobalt surrounded by a coating of an oxide of iron and cobalt. The particles are prepared by electrodeposition and are then oxidized to form the outer oxide shell on the particles.

It is a principal object of the present invention to provide iron-cobalt oxide magnetic material of substantially improved magnetic properties. It is a further object of this invention to provide a process for increasing the magnetic properties of such fine particle magnetic material which is economically and easily carried out.

It has been discovered that the magnetic properties of the iron-cobalt oxide materials of my above-identified copending application Serial No. 69,810 may be substantially improved by subjecting the electrodeposited particles to an alternating current (A.-C.) field prior to oxidation. Such a treatment unexpectedly improves the magnetic induction, particle alignment and total magnetic energy of permanent magnets made from the particles so treated. Such particles are distinguished from particles which have not received an A.-C. treatment by a thinner oxide coating and thus less total oxygen content. In addition, the particles are oxidized in a shorter period of time.

In general, the process of this invention comprises electrodepositing fine particles of an alloy of iron and cobalt into a liquid metal cathode, such as mercury, subjecting the deposited particles to an A.-C. field and reacting the particles with oxygen to form particles having an iron-cobalt alloy core and a coating of an oxide of iron and cobalt.

The magnitude of the A.-C. field is limited only by the fact that a field which is too low does not achieve maximum improvement in magnetic properties, whereas a field higher than a certain threshold achieves no further improvement in magnetic properties. A field ranging from about 2000 to 4000 gauss and specifically about 3000 gauss has been found adequate to achieve maximum improvement in magnetic properties.

Tests of the magnetic properties of the particles in a given sample will enable a relatively easy determination of the appropriate field. The particles should be subjected to the electrical field for a time of about five to twelve seconds and preferably about ten seconds. Too long a period of exposure to the field degrades magnetic properties—too short an exposure results in less than maximum property improvement. The time will be a function of other variables, and, as with the field, may be ascertained for a given sample by property determinations.

Electron diffraction studies of the oxidized, A.-C. treated particles of this invention indicate that the particles have a ferromagnetic core of iron-cobalt and a ferrimagnetic shell of iron-cobalt oxide. The crystallographic orientation of the shell and core have the proper orientation with respect to each other resulting in a favorable alignment of the electron spins so that the net magnetization of the particles is increased.

The electrodeposition procedure is carried out by electrolytically depositing the iron-cobalt particles from an acidic electrolyte comprising iron and cobalt ions. It is preferred that the interface between the cathode and the electrolyte be maintained quiescent during the electrolytic deposition procedure. By maintaining a quiescent interface, elongated rather than spheroidal particles will be produced and the former are the preferred configuration of particles constituting the magnetic material of this invention.

The electrolyte used for electrodeposition of the iron-cobalt particles may consist of the soluble bivalent salts of iron and cobalt, suitable examples of which are iron or cobalt sulfates or chlorides. The pH of the electrolyte should be made acidic with, for example, sulfuric or hydrochloric acid, and a preferred pH is approximately 2. The anode may either be a consumable anode such as pure iron or pure cobalt, or a cobalt-iron alloy, or it may be a non-consumable anode of an inert material such as platinum, lead or graphite. The cathode is a liquid metal, preferably mercury.

The current density may be varied over a wide range. It will generally be lower than the current density employed to electroplate particles which are not intended to be oxidized. Current densities varying from 3 amps/sq. ft. to 80 amps/sq. ft. have been found to produce particles having a coercive force in their compacted state in excess of 1500 oersteds. Ordinarily, the higher the current density, the shorter the time of deposition. A current density of 10 to 20 amps/sq. ft. for 200 to 480 minutes has been found to produce optimum magnetic properties, although acceptable results have been achieved over a wide range of current densities and times.

The ratio of iron to cobalt ions in the electrolyte will depend, of course, upon the desired iron-cobalt composition of the electrodeposited particles. In addition, both current density and electrolyte temperature affect the composition of the electrodeposited particles.

After electrodeposition is completed, the iron-cobalt particle-mercury slurry is heat-treated to eliminate the dendritic branches on the particles thereby increasing their coercive force. The heat treatment may vary from about 1 to 80 minutes, with the temperature varying up to 300°C. but preferably at about 200°C.

Following the heat-treating steps, the mercury and iron-cobalt, particles may, if desired, be concentrated as, for example, magnetically, to remove excess mercury. The particles are then placed in an oxidizing environment. The oxidizing environment may simply consist of air at room temperature, and preferably moist air having a relative humidity greater than 50%. In view of the extremely small size of the particles, they will, however, readily oxidize even in the ambient atmosphere and sufficient oxidation will take place in such an atmosphere if the time of exposure is sufficiently long. One method of oxidizing the particles is to place the electroplated and heat-treated particles in a closed container with a fresh air intake and outlet. The air may be bubbled through water prior to passage through the intake to increase the humidity and thus promote oxidation.

In place of moist air oxidation, the particles may be oxidized in the presence of a chemical oxidizing agent by covering the mercury-iron-cobalt particles with a solution of the chemical oxidizing agent. Chemical oxidizing agents found to prove satisfactory are potassium dichromate, both concentrated and dilute, potassium premanganate, and hydrogen peroxide. Other oxidizing agents will readily occur to those skilled in the art. In general, the optimum oxidation time in moist air having a relative humidity greater than 50% appears to range from 15 to 25 hours at room temperature, with 16 hours proving to yield the optimum magnetic properties, although the changes taking place in magnetic properties after 25 hours of oxidation are found to be small. In the case of chemical oxidation, the optimum oxidizing time appears to be between 48 and 72 hours.

In view of the variety of methods by which the particles may be oxidized, precise times, oxidizing conditions or temperatures cannot be given. However, the oxidation should be carried out until the particles possess a coercive force at least 500 oersteds (measured at −196° C.) in excess of that of the corresponding unoxidized particles of pure iron and cobalt. The oxygen content of such particles is approximately 10% by weight of the total weight of the particles. A preferred amount of oxygen is that amount present in a particle in which the volume of the iron-cobalt oxide shell is from 5 to 40% of the total volume of the particle.

While improved coercive force is obtained with any proportions of cobalt and iron, the intrinsic saturation magnetism of the magnetic materials decreases with increased cobalt content. Moreover, the greater relative cost of cobalt as compared with iron would ideally point to the use of as little cobalt as possible. Optimum proportions of cobalt have been found to be from about 30 to 55% cobalt based on the weight of the iron and cobalt before oxidation.

After oxidation is completed, the particles may be concentrated magnetically or mechanically in view of the fact that the oxidized particles are not wet by the mercury, as is the case with unoxidized particles, and therefore float to the surface of the mercury when the required degree of oxidation has occurred. Any remaining mercury may be removed from the oxidized particles, either mechanically as by flotation, or by vacuum distillation. Vacuum distillation can be accomplished by distilling off the mercury in the presence of a vacuum for periods ranging from 4 to 8 hours.

After the mercury has been removed from the oxidized iron-cobalt particles and the powder has been dried, the powder may be compacted in a non-magnetic die while aligned in the presence of either a D.C. field or an A.C. and D.C. field to form a finished magnet. Optimum magnetic properties will be obtained if the powder is directionalized or aligned prior to compaction. The quantity of pressure used in compacting the fine particle magnetic materials has a great effect on the resulting magnetic properties of the compact. By increasing the pressure, the intrinsic saturation induction, residual induction, and the maximum energy product all increase. The compacting pressure may range as high as 50 tons/sq. in. or even higher. Very small decreases in coercive force occur as the packing fraction increases.

The following Table A illustrates the preparation of two permanent magnets. Example 1 is an iron-cobalt-oxygen magnet which was not subjected to an A.C. field; Example 2 is a similar magnet subjected to an A.C. field prior to oxidation in accordance with the practice of the present invention. In both examples, oxidation was terminated when the particles had floated to the surface of the mercury.

Table A

| Process Steps | Example 1 | Example 2 |
| --- | --- | --- |
| 1. Electrodeposition | Current density, 15 amps/sq. ft. Time, 200 min. | Same. |
| 2. Heat Treatment | 12 min. at 200° C | Same. |
| 3. A.-C. Treatment | None | 3,000 gauss, 10 seconds. |
| 4. Oxidation | 19 hrs. at room temp. in 80% R.H. | 16 hrs. at room temp. in 80% R.H. |
| 5. Compaction | 40 tons/sq. in., 4,000 gauss D.-C. field. | Same. |

The following Table B compares the magnetic properties of the two examples.

Table B

| Properties | Example 1 | Example 2 |
| --- | --- | --- |
| Br (Residual Induction) | 5,800 gauss | 6,500 gauss. |
| Bis (Intrinsic Magnetic Induction). | 6,600 gauss | 7,150 gauss. |
| Br/Bis (alignment) | 0.880 | 0.910. |
| Hc (Coercive Force) | 1,600 oersteds | 1,650 oersteds. |
| (BH) max. (total Magnetic Energy). | $4.0 \times 10^6$ gauss-oersteds. | $4.6 \times 10^6$ gauss-oersteds. |

The fine particle magnetic material may, if desired, be compacted into its final magnet shape with an organic binder, a suitable example of which is a vinyl alcohol-acetate resin. If a binder is added, the binder should be added after the fine particles have been oxidized and the mercury removed. Compacted permanent magnets of the fine particles are stable indefinitely at temperatures below 100° C. The loose, uncompacted particles have been found to increase their oxygen content less than 1% when stored in moist air for 800 hours at room temperature.

What I claim as new and desire to secure by Letters Patent of the United States is:

1. A process for preparing magnetic material comprising in sequence
   electrolytically depositing fine particles into a liquid metal cathode from an electrolyte in which the metallic ions consist essentially of iron and cobalt,
   subjecting the deposited particles to an A.-C. generated magnetic field for a time and an intensity sufficient to improve the magnetic properties of the particles, and
   oxidizing said particles to form particles having a core of an alloy of iron and cobalt and a coating surrounding said core, said coating being an oxide of iron and cobalt, the dimensions of each of said particles being that of a single magnetic domain.

2. A process for preparing magnetic material comprising in sequence
   electrolytically depositing fine particles into a liquid metal cathode from an electrolyte in which the metallic ions consist essentially of iron and cobalt while maintaining a quiescent interface between said cathode and said electrolyte,
   subjecting the deposited particles to an A.-C. generated magnetic field for a time and an intensity sufficient to improve the magnetic properties of the particles, and
   oxidizing said particles to form particles having a core of an alloy of iron and cobalt and a coating surrounding said core, said coating being an oxide of iron and cobalt, each of said particles being elongated and having a transverse dimension of a single magnetic domain.

3. Magnetic material prepared in accordance with the process of claim 2.

4. A process for preparing magnetic material comprising in sequence electrolytically depositing fine particles of an alloy consisting essentially of iron and cobalt into a liquid metal cathode, subjecting the deposited particles to an A.-C. generated magnetic field for a time and an intensity sufficient to improve the magnetic properties of the particles, and oxidizing said particles at room temperature in the presence of moist air to form particles, each of which has a core of an alloy of iron and cobalt surrounded by a coating of an oxide of iron and cobalt.

References Cited by the Examiner

UNITED STATES PATENTS 2,974,104 3/61 Paine et al. _____ 204—10
2,988,466 6/61 Meiklejohn _____ 148—108
(Corresponding to French Patent 1,168,240)

FOREIGN PATENTS 1,168,240 12/58 France.

JOHN H. MACK, *Primary Examiner.*

WINSTON A. DOUGLAS, *Examiner.*